United States Patent [19]

Namy et al.

[11] 4,370,154

[45] Jan. 25, 1983

[54] GAS DIVERSION UNIT

[75] Inventors: Gerald Namy, Saint-Etienne; Jean Cordier, Dunkerque, both of France

[73] Assignees: Creusot-Loire Entreprises, Courbevoie; Usinor, Paris, both of France

[21] Appl. No.: 152,141

[22] Filed: May 22, 1980

[30] Foreign Application Priority Data

Jun. 7, 1979 [FR] France ................................. 79-14583

[51] Int. Cl.³ .............................................. B01D 46/00
[52] U.S. Cl. ........................................ 55/309; 55/355; 55/457; 55/459 B; 137/872; 266/157; 266/159
[58] Field of Search ...................... 266/159, 144, 157; 55/309, 92, 312–314, 355, 459 B, 457; 137/872

[56] References Cited

U.S. PATENT DOCUMENTS

| 934,447 | 9/1909 | Lea | 137/248 |
| 2,729,301 | 1/1956 | Elkstrom | 55/314 |
| 2,831,467 | 4/1958 | Guczky | 55/314 |

FOREIGN PATENT DOCUMENTS 128431 2/1902 Fed. Rep. of Germany ...... 137/248

Primary Examiner—Bernard Nozick
Attorney, Agent, or Firm—Pollock, Vande Sande & Priddy

[57] ABSTRACT

A unit for diversion of a gas which may be hot, dust-laden, saturated with water vapor and containing water droplets, e.g. from steelworks converters, the unit enabling at one and the same time the flow of gases which it receives tangentially and horizontally from the gas collecting network (8) to be caused to flow either into a first vertical duct (14) directed upwards or into a second vertical duct (3) directed downwards, the water droplets and consequently part of the dust to be eliminated, and simultaneously gastightness to be ensured towards that one of these two ducts which is at the moment not being fed with gas, this unit being characterized in that it comprises a fixed body (1) containing a movable bell (2) capable of forming a water seal to ensure gastightness alternatively towards each of the two vertical ducts (14) (3), and in that the fixed body (1) being of special shape cooperates with the bell (2) in order to form a cyclone which eliminates the water droplets and part of the dust contained in the gas at the inlet to the body (1).

5 Claims, 6 Drawing Figures

4,370,154

GAS DIVERSION UNIT

FIELD OF THE INVENTION

The present invention refers to a complex device for diversion of gases and especially of those collected at the spout of steelworks converters or proceeding from similar installations.

BACKGROUND

The gases collected at the spout of steelworks converters are at high temperature and dustladen. If they are collected without burning or with only partial burning of the carbon monoxide which they contain, they have a certain calorific value. Hence it may be interesting to recover them and then to employ them as fuel or as reducer gases.

After they have passed in succession through the collector hood, the cooling chimney, the saturator, the washer and the induced draught fan, these cooled but still hot gases are saturated with water vapor and contain water droplets.

After passing through the induced draught fan these gases may have two destinations:

either that of being exhausted to the atmosphere by way of a chimney ending in a flare in which the carbon monoxide is burnt to carbon dioxide;

or that of being directed towards a storage gasometer and a distribution network.

The direction of the gases sometimes towards the one and sometimes towards the other of these two routes, necessitates a special diversion device which ensures satisfactory safety of operation under conditions rendered difficult by the large flows of gas and by the nature of these gases which are still hot although cooled, still dustladen although they have been subjected to dust extraction, and which may be saturated with water vapor and contain water droplets.

Various types of such devices are already known. But they are in general bulky; their operation is slow and the load loss which they cause in the gas circuit is high.

SUMMARY OF THE INVENTION

The aim of the present invention is to produce a very compact diversion device which is operated rapidly and the load loss from which, created in the circuit, is low and remains constant in any position of the movable part. Another aim of the invention is to achieve elimination of the water droplets contained in the gases.

For this purpose the object of the present invention is a unit for diversion of a gas which may be hot, dustladen, saturated with water vapor and containing water droplets, the unit enabling at one and the same time the flow of gases which it receives tangentially and horizontally from the gas collecting network to be caused to flow either into a first vertical duct directed upwards or into a second vertical duct directed downwards, the water droplets and consequently part of the dust to be eliminated, and simultaneously gastightness to be ensured towards that one of these two ducts which is at the moment not being fed with gas, this unit being characterized in that it comprises a fixed body containing a movable bell capable of forming a water seal to ensure gastightness alternatively towards each of the two vertical ducts aforesaid, and in that the said fixed body being of special shape cooperates with the said bell in order to form a cyclone which eliminates the water droplets and part of the dust contained in the gas at the inlet to the body.

In a low position the bell rests in a fixed water seal which ensures gastightness between the gas collecting network and the use network, whilst the gas is discharged into the upper portion of the body and is directed towards a flare in order to be burnt in it.

In a high position a metal skirt attached to the body of the bell and forming a water seal movable with the bell ensures by simple application against a suitable fixed portion, gastightness between the gas collecting network and the network leading to the flare, whilst the gas is discharged into the lower portion of the body and is directed towards the use network and its gasometer.

In accordance with one possible option of the present invention, the previously mentioned metal skirt attached to the body of the bell may be replaced by a gastight device known as the dry seal type consisting of a tapered crown integral with the bell to ensure gastightness between the gas collecting network and the network leading to the flare, by simple fitting of the said tapered crown against a suitable fixed portion. Intermittent sprinkling above the dry seal enables regular washing of the latter and maintains the cleanliness of the zone necessary to good gastightness.

In accordance with another possible option of the present invention, a water tower located under the seating of the bell in the low position feeds by gravity a hydraulic safety seal located beneath it, which seal ensures rapid and effective gastightness between the diversion unit and the use network. The reduction in the time of formation of the hydraulic seal will be obtained by acting upon the cross-section of the flow of water between the water tower and the hydraulic seal or/and by acting upon the pressure prevailing in the water tower. It is recommended that the formation of this hydraulic safety seal be operated automatically in the event of mishap, especially at the time of the detection of a reversal of the flow of gas in the use network.

In accordance with another possible option of the present invention, the diversion unit may advantageously be equipped with a device for balancing the gas pressures upstream and downstream of the hydraulic safety seal, consisting of a non-return water valve which operates in both the senses of accidental overpressure or underpressure between the point downstream of the diversion unit and the use network.

In accordance with another possible option of the present invention, the gas diversion unit in accordance with the invention includes in its lower portion a propeller the hub of which serves as a lower guide for the operating rod of the bell and the blades of which by setting the gas in rotation contribute to the separation of the vesicular water contained in the gas.

The invention also has as its object a method of operation of the gas diversion unit previously defined, characterized in that the lowering of the bell, operated mechanically, complies with a cycle of speed which is such that lowering is fast, that is to say, the speed lies between 18 and 60 meters per minute before the bell has made contact with the fixed water seal, and such that lowering is slow, that is to say, the speed lies between 1 and 6 meters per minute from the instant when the bell has penetrated into the fixed water seal, and reciprocally as regards the raising of the bell.

As may be understood, one of the main advantages of the gas diversion unit in accordance with the invention is that of being very compact and thus of being easily integrated into the general scheme of a steelworks, even an existing one or one which is to be converted, whilst nevertheless allowing the passing of very large flows of gas.

Another advantage of the device in accordance with the invention and also of its method of operation is that of enabling fast operation of the bell between its high and low positions. This operation time may be, for example, of the order of 5 seconds.

Another advantage of the device in accordance with the invention is that the load loss which it creates in the flow circuit of the gases is low. A supplementary advantage is that this load loss remains practically constant whatever the position of the bell (high, intermediate, or low). The integration of the valve into the installation has no influence upon the process of collection.

Another essential and original advantage of the device in accordance with the invention is that it ensures at the same time as the diversion of the gas towards the flare or towards the gasometer, the elimination of almost the whole of the water droplets and of a good portion of the dust contained in the gas, due to its cyclone configuration.

Another advantage of this device is that is achieves rapidly a positive water seal with a hydraulic guard which is hence perfectly gastight (either upwards or downwards) and of high head, which ensures for it good behavior against accidental overpressures.

Its safety of operation in the event of general network breakdown (electricity or compressed air) is positive, because the bell then falls of its own weight into the safety position, that is to say, in the position of isolation from the gasometer and of placing in communication with the flare.

The position of the bell and its safety features may be visualized without ambiguity.

The correct operation of this diversion unit is possible even with dirty gas, due to the design and the arrangement of the various constituent parts. Furthermore it eliminates the dirty vesicular water which may possibly be contained in the gas which has just passed a washed fan. The operation of this device is insensitive to freezing, circulation of water being ensured permanently.

In order to let the invention be well understood an embodiment in accordance with the invention will be described below by way of non-restrictive example, of a unit for diversion of the gases from a steelworks converter, collected without burning, that is to say, practically without parasitic entry of outer air.

DETAILED DESCRIPTION

Figures 1, 2:
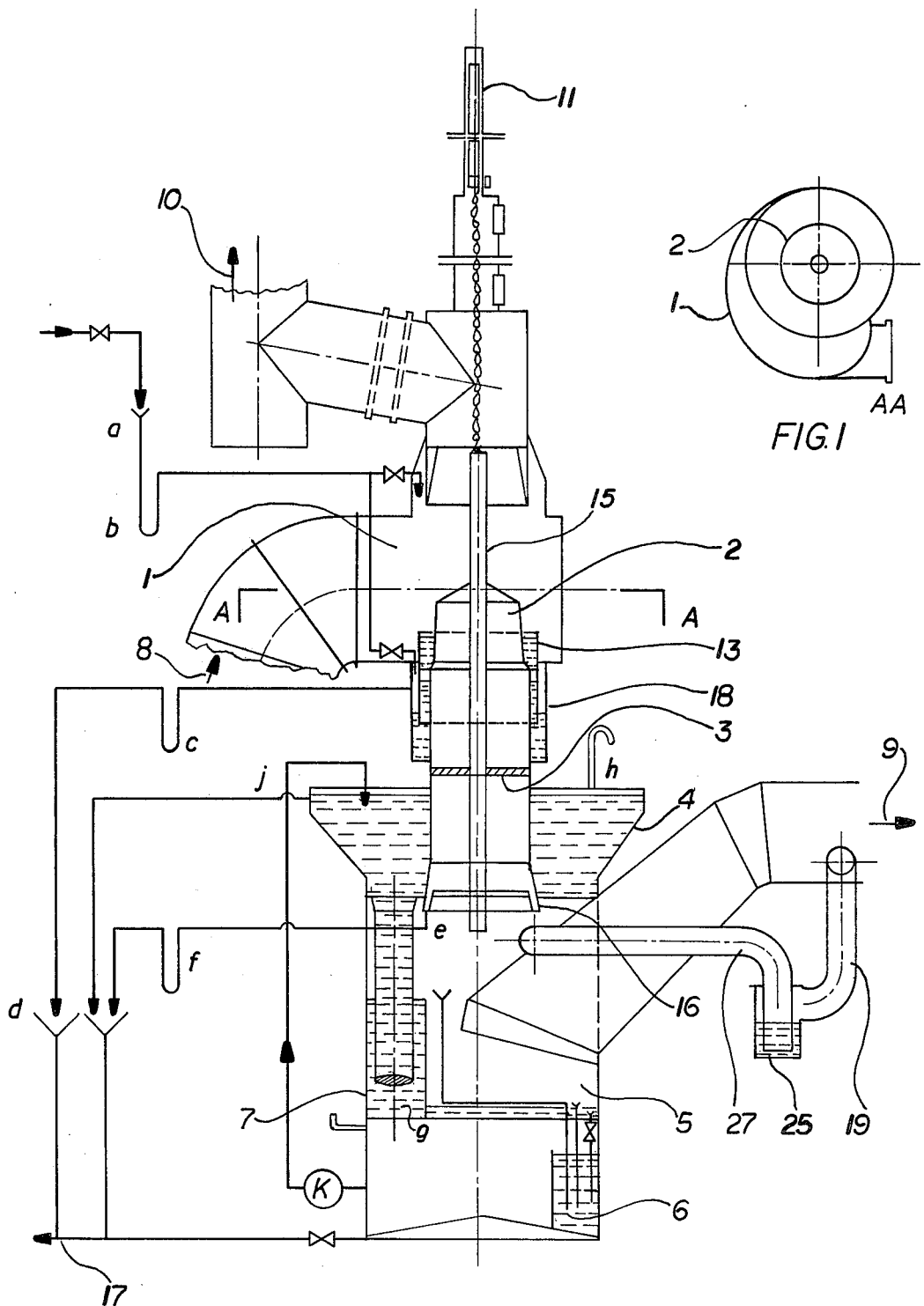
FIG. 1 is a horizontal section (along AA in FIG. 2) of the diversion unit at the level of the inlet of the gas proceeding from the steelworks converter and from the extractor fan. It shows the tangential inlet and the cylindrical body forming a cylcone.
FIG. 2 is a diagrammatical vertical section of this unit with the low position of the bell, that is to say, with the gas put into communication with the flare.

In FIG. 1 it may be seen that the horizontal inlet of the gas into the diversion unit is effected tangentially to the fixed body 1 which forms with the movable bell 2 of a cyclone which directs the gas upwards or downwards by the movement of the bell 2 and eliminates the vesicular water.

In FIG. 2 the bell 2 is in the low position. It rests in a fixed water seal 18 which ensures the gastightness between the collecting network 8 and the use network 9. The gas passes into the upper portion of the body 1 and is directed at 10 towards the flare. The movable bell is operated by the jack 11.

Figure 3:
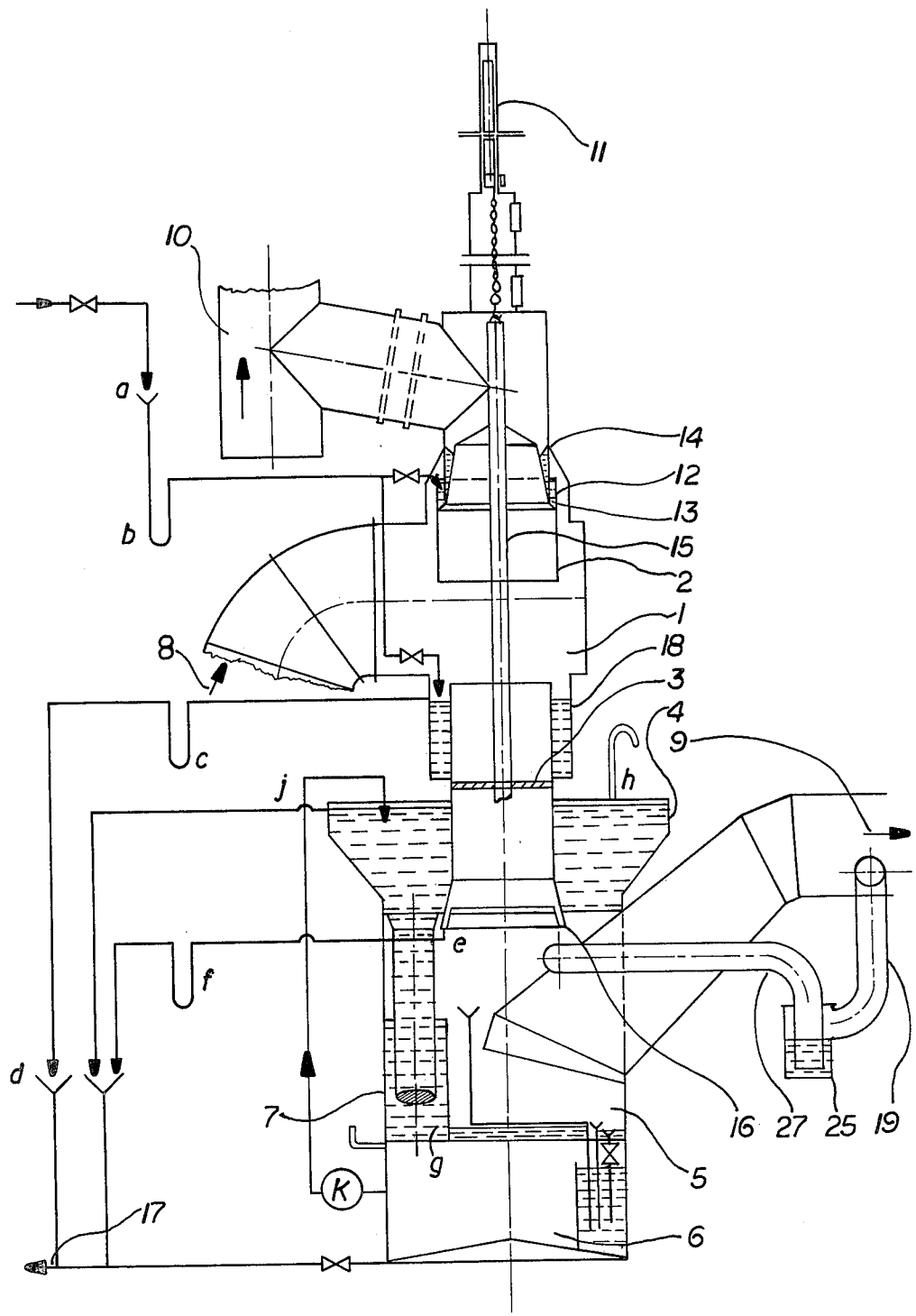
FIG. 3 is a diagrammatical vertical section through this same unit with the high position of the bell, that is to say, with the gas put into communication with the gasometer.

In FIG. 3 the bell 2 is in the high position. A skirt 12 attached to the bell 2 and containing a movable water seal 13 achieves by simple application against a suitable fixed portion 14 the gastightness between the collecting network 8 and the circuit 10 towards the flare. The gas passes into the lower portion of the body 1 and is directed towards the use network 9 and its gasometer, passing through the vesicular water separator 3, the water thus recovered being discharged by way of the gutter 16. The said vesicular water separator 3 consists essentially of a propeller the hub of which seves as a lower guide for the operating rod 15 of the bell 2.

Figure 4:
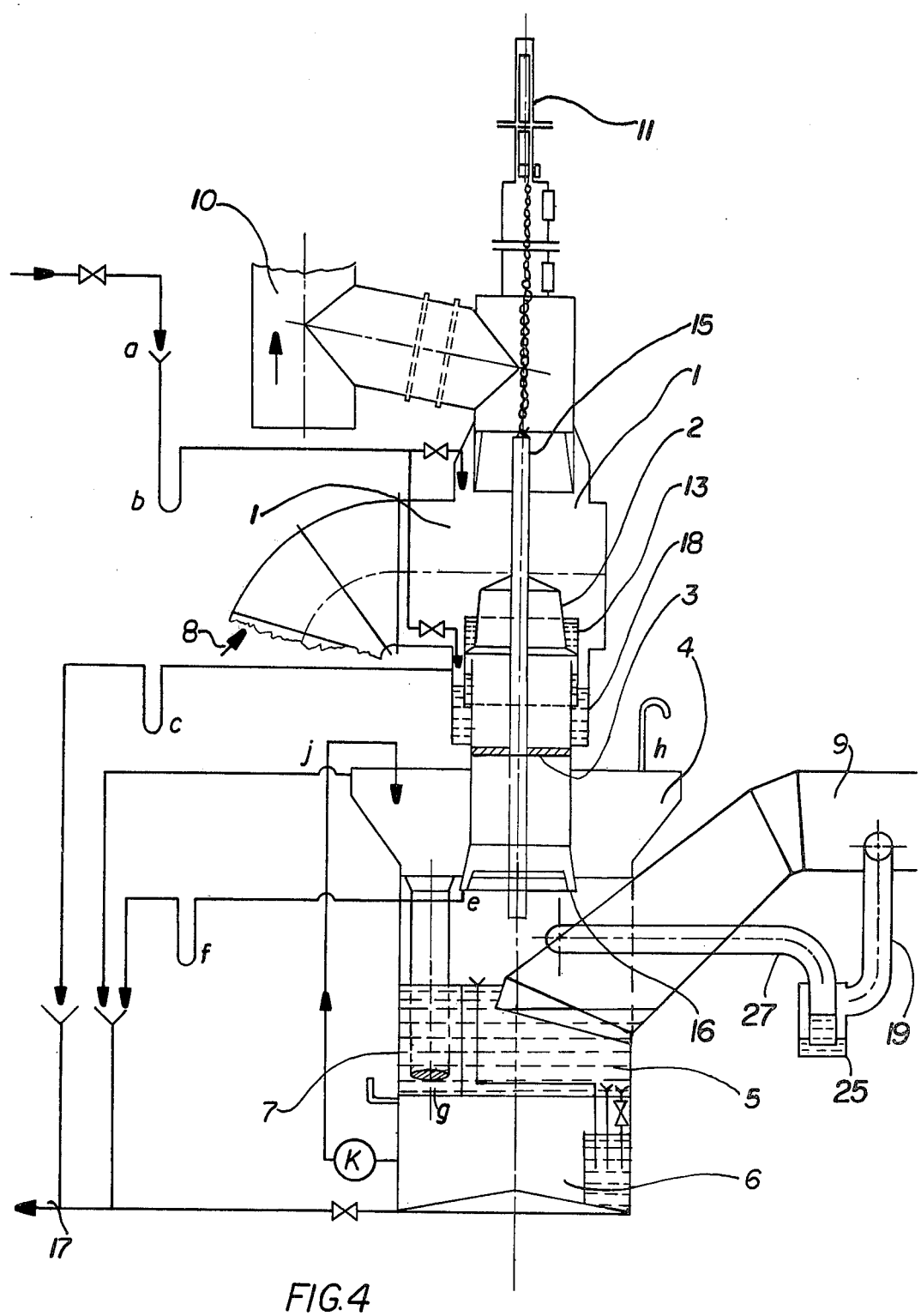
FIG. 4 is a diagrammatical vertical section through this same unit when in the event of accident the start of the duct towards the gasometer is isolated hydraulically.

A water tower 4 located under the bell 2 and round the separator 3 can feed by gravity and by way of a hydraulic guard 7 a hydraulic seal 5 located lower down, which in case of need can form a rapid and effective isolation between the diversion unit and the use network 9, as shown in FIG. 4. Under this hydraulic seal 5 is arranged a decanter tank 6. When the hydraulic seal 5 is removed this tank enables the clean water to be returned by means of a pump k into the water tower 4 and the muddy water to be returned elsewhere at 17.

The operation of this diversion unit is as follows:

Operation without recovery (FIG. 2)

The bell 2 is in the low position.

The lower water seal of the bell is fed through a and a hydraulic guard b. This water as well as the vesicular water separated from the gas in the body 1 due to the cyclone effect is discharged by way of the hydraulic guard c at d.

Satisfactory operation of the hydraulic seal is checked at d.

The water from the circuit is discharged at 17.

Operation during the recovery phase (FIG. 3)

The bell is in the high position, the upper hydraulic seal 13 of the bell is fed through a and the hydraulic guard b.

The water is discharged by way of the low portion of the valve and of the hydraulic guard c.

Satisfactory operation of the water seal is checked at d.

The vesicular water is separated from the gas firstly in the body 1 thanks to the cyclonic effect and discharged at 17 by way of the hydraulic guard c and secondly by the propeller 3 in order to be collected in the gutter 16 at e and then discharged at 17 by way of a hydraulic guard f.

The cycle of operation of lowering and raising the bell is described below:

In normal operation, recovery of the gases by the use circuit 9 starts with a certain delay after the start of the blowing and ends with a certain lead before the end of the blowing. The operation of raising the bell is triggered either manually by the operator or automatically in sequence, inasmuch as furthermore lock-out exists if all of the conditions which authorize this transfer to recovery are not reconciled.

The order for raising having been given, the bell leaves its low position in order to reach rapidly the high speed condition the adjustable value of which lies between 18 and 60 m/mn. The transfer to low speed of 1 to 6 m/mn is automatically triggered about 300 mm before the end of travel.

The operation of lowering the bell is ordered either manually by the operator or automatically in sequence or as the result of triggering of a safety device at the level of the device or upstream or downstream of the latter.

The order for lowering having been given, the bell leaves its high position in order to reach rapidly the high speed condition the adjustable value of which lies between 18 and 60 m/mn. The transfer to low speed occurs automatically after penetration of the bell 2 into the hydraulic guard 18.

Operation of the lower water seal (FIG. 4)

In the event of mishap the lower hydraulic seal 5 is formed by opening the shut-off system g.

A vent h located at the upper part of the water tower avoids putting the latter under reduced pressure.

Overfill when necessary returns to drain by the overflow from the tank j.

When it is required to break the water seal 5 the water is transferred into the decanter tank 6. The clean water is then returned into the water tower 4 by means of the pump k whilst the turbid water is discharged at 17.

A balancing safety device 25 avoids large pressure differences between the upstream 27 and the downstream 19 of the seal 5.

Figure 5:
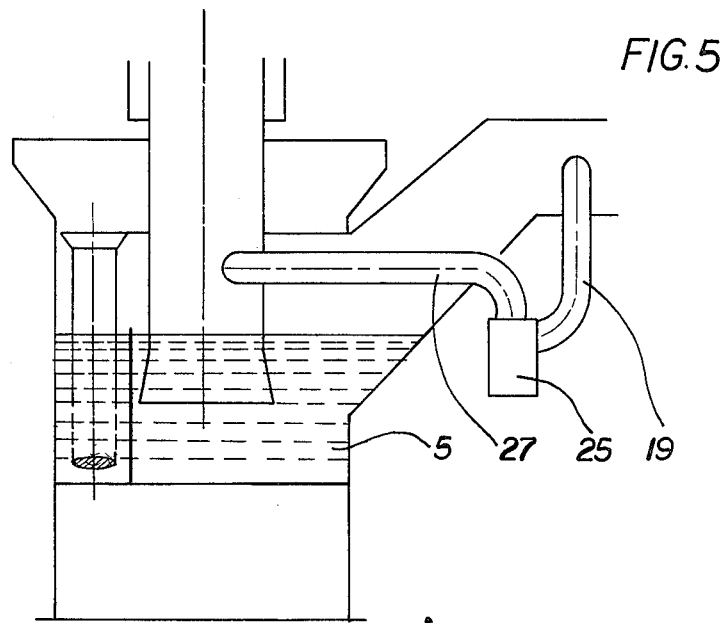
FIG. 5 is a diagrammatical vertical section through a safety seal including an immersed inlet duct for the gases and an outlet by the periphery.

Safety device for satisfactory operation of the lower water seal 5 (FIG. 5)

FIG. 5 represents a vertical section through a balancing safety device 25 of the gas pressures upstream and downstream of the lower hydraulic seal 5. It is in fact a non-return valve which operates in both senses of accidental overpressure or underpressure between upstream 27 and downstream 19 of the seal 5 in order to damp out especially the accidental differences in pressure which would be capable of driving the water violently from the lower hydraulic seal 5 if this device 25 did not exist.

This balancing safety device 25 is in communication on the one hand with the upstream side of the seal 5 through the pipe 27 and on the other hand with the downstream side of the seal 5, that is to say, the use network 9, through the pipe 19.

Dry seal (FIG. 6) (variant upon the upper hydraulic seal in accordance with FIG. 3).

Figure 6:
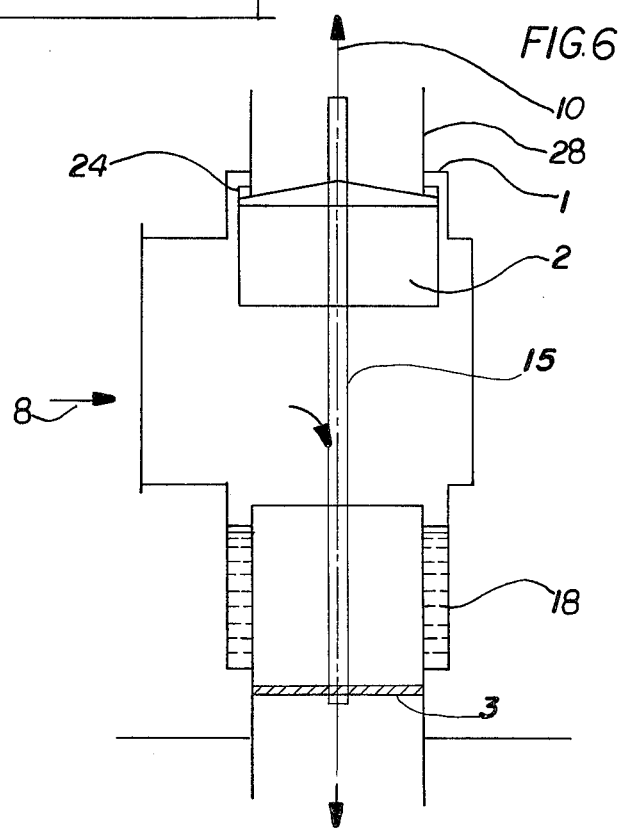
FIG. 6 is a diagrammatical section representing the upper portion of the fixed body of the diversion unit and its movable bell in the case of the option of the dry seal.

FIG. 6 represents a variant of dry seal type, upon the upper hydraulic seal 13 as FIG. 3.

In this variant the bell 2 no longer includes the metal skirt 12 represented in FIG. 3. It has on its upper face a tapered crown 24 which comes and fits against the bottom end of the duct 28 feeding the network 10 to the flare. It is necessary to keep this tapered crown in a very good state of cleanliness by intermittent but frequent sprinkling. Under these conditions the gas tightness thus ensured by the dry seal is satisfactory.

It is obvious that without departing from the scope of the invention one may conceive of variants and improvements in detail as well as envisaging the use of equivalent means.

The device in accordance with the invention is applicable particularly well to the diversion of the gases collected at the spout of steelworks convertors. But its possible applications are very diverse because it may be applied usefully to the diversion of any industrial gases which are hot, dustladen and saturated with water vapor.

What is claimed is:

1. A gas diversion unit comprising
   (a) a vertical axis generally cylindrical housing having upper and lower outlets;
   (b) a gas feed inlet horizontally connected to said housing;
   (c) a bell movable between said upper and lower outlets; and
   (d) steel lip-water trough gas seals formed between said bell and said housing when said bell is at its uppermost or lowermost position;
   (e) waste gases being directed to a stack open to the atmosphere when said bell is at one of its extreme positions and to a processing network duct when said bell is at the other of its extreme positions; and
   (f) the inlet and housing connection being in the form of a cyclone, for separating out water droplets and dust contained in the waste gases.

2. A gas diversion unit according to claim 1, wherein said stack is sealed off when said bell is in its uppermost position, and said processing network duct is sealed off when said bell is in its lowermost position.

3. A gas diversion unit according to claim 2, comprising a fixed vertical axis propeller located in said housing below said movable bell, whereby water in the waste gases may be extracted.

4. A gas diversion unit according to claim 2, wherein said processing network duct is connected to a chamber located below said housing and a reservoir of water is located above said chamber, whereby, in an emergency, said chamber can be flooded by releasing the water in said reservoir, sealing off said processing network duct.

5. A gas diversion unit according to claim 4, comprising means for equalizing gas pressures occurring upstream and downstream of the flooded chamber.

* * * * *